(12) United States Patent
Martin et al.

(10) Patent No.: US 8,087,063 B2
(45) Date of Patent: Dec. 27, 2011

(54) SYSTEM AND METHOD FOR PRESERVATION OF DIGITAL RECORDS

(75) Inventors: Sean Martin, Bowie, MD (US); Roy S. Rogers, IV, Middletown, MD (US); Matthew J. McKennirey, Bethesda, MD (US); Mark J. Evans, Silver Spring, MD (US)

(73) Assignees: Lockheed Martin Corporation, Bethesda, MD (US); Fenestra Technologies Corporation, Germantown, MD (US); Tessella Inc., Newton, MA (US)

( * ) Notice: Subject to any disclaimer, the term of this patent is extended or adjusted under 35 U.S.C. 154(b) by 1265 days.

(21) Appl. No.: 11/797,567

(22) Filed: May 4, 2007

(65) Prior Publication Data
US 2007/0271258 A1 Nov. 22, 2007

Related U.S. Application Data

(60) Provisional application No. 60/797,754, filed on May 5, 2006, provisional application No. 60/802,875, filed on May 24, 2006.

(51) Int. Cl.
*G06F 7/04* (2006.01)
(52) U.S. Cl. .......................................................... 726/2
(58) Field of Classification Search ................. 726/2, 27; 707/607, 609, 667; 713/168
See application file for complete search history.

(56) References Cited

OTHER PUBLICATIONS

CCSDS, "Consultative Committee for Space Data Systems" Reference Model for an Open Archival Information System (OAIS) Jan. 2002 XP-002449445.*
Lee et al., "The State of the Art and Practice in Digital Preservation," Journal of Research of the National Institute of Standards and Technology, vol. 107, No. 1, Jan.-Feb. 2002, pp. 93-106.
Hendley, "Comparison of Methods & Costs of Digital Preservation," Internet Citation, May 29, 1998, pp. 1-121.
Rauber et al., "Part of Our Culture is Born Digital—On Efforts to Preserve it for Future Generations," Trans Internet-Zeitschrift fuer Kulturwissenschaften, No. 10, Jul. 2001, 16 pages.
Office Action mailed Feb. 28, 2011 in Canadian Application No. 2,587,759 (3 pages).

* cited by examiner

*Primary Examiner* — Samson Lemma
(74) *Attorney, Agent, or Firm* — Nixon & Vanderhye P.C.

(57) ABSTRACT

A method for digitally preserving an electronic record includes defining a preservation and service plan for the electronic record in a model, the preservation and service plan including access requirements and authenticity requirements for a digital adaptation of the electronic record, and characteristics of the electronic record to be preserved in the digital adaptation of the electronic record, the model assigning a numeric value to each requirement and characteristic and to the relative importance of each requirement and characteristic; for each data type included in the electronic record, assigning a capability score to each digital adaptation processor that supports the data type, the capability score being indicative of the ability of the digital adaptation processor to meet the access and authenticity requirements and preserve the characteristics as valued in the model; and comparing the capability scores to determine the digital adaptation processor that most closely matches the model. An electronic record archive includes a preservation and service plan management package; a digital adaptation package; and a preservation processing package.

18 Claims, 12 Drawing Sheets

Preservation objective model

| Type | Requirement | Scale/Degree of Fidelity | Weighting/Relative Importance |
|---|---|---|---|
| Service | Location Dependency | 0 = specified site, specified network<br>1 = specified network<br>2 = none required | Numerical value (1 to n, where n is the number of requirements in the objective model), indicating the relative importance of this requirement within the preservation objective mode.<br>1 = High<br>n = Low |
| | Device Dependency | 0 = specific processor, specific hardware<br>1 = specific hardware<br>2 = none required (common devices) | as above |
| | Software Dependency | 0 = specified, constrained availability<br>1 = specified, readily available<br>2 = none required (commonly used) | as above |
| Characteristics | Perceptual | 0 = no importance<br>1 = marginal information value<br>2 = useful<br>3 = important<br>4 = critically important | |
| | Logical | as above | as above |
| | Functional | as above | as above |
| | Temporal | as above | as above |
| | Spatial | as above | as above |
| Authenticity | Certifiable | 0 = false<br>1 = true | as above |
| | Reference Object/Normative Copy | 0 = false<br>1 = true | as above |

FIG. 6A era:Dp Type

| era:DpFormatId |
| type | xs:string |

The unique programmatic signature of this data type- For purposes of identifying it era:DpFormatCat
Catagory of data format; text, image, etc.

era:DpSemantics
The description of the operations of the data format era:DpEncodings
Encoding used in the data type era:DpSupertype
If applicable, a parent date type

| era:Format |
| type | FormatType |

Global Format Registry Root Element

To FIG. 6B

Preservation objective model

| Type | Requirement | Scale/Degree of Fidelity | Weighting/ Relative importance |
|---|---|---|---|
| Service | Location Dependency | 0 = specified site, specified network<br>1 = specified network<br>2 = none required | Numerical value (1 to n, where n is the number of requirements in the objective model), indicating the relative importance of this requirement within the preservation objective mode.<br>1 = High<br>n = Low |
| | Device Dependency | 0 = specific processor, specific hardware<br>1 = specific hardware<br>2 = none required (common devices) | as above |
| | Software Dependency | 0 = specified, constr ained availability<br>1 = specified, readily available<br>2 = none required (commonly used) | as above |
| Characteristics | Perceptual | 0 = no importance<br>1 = marginal information value<br>2 = useful<br>3 = important<br>4 = critically important | |
| | Logical | as above | as above |
| | Functional | as above | as above |
| | Temporal | as above | as above |
| | Spatial | as above | as above |
| Authenticity | Certifiable | 0 = false<br>1 = true | as above |
| | Reference Object/ Normative Copy | 0 = false<br>1 = true | as above |

FIG. 7

Digital Adaptation Framework

| Preservation and Service Plan | | | Digital Adaptation Descriptor 1 | Digital Adaptation Descriptor 2 |
|---|---|---|---|---|
| Characteristic | Degree of Fidelity | Relative Importance | Conversion Assessment | Conversion Assessment |
| Perceptual | 4 | 1 | 4 | 0 |
| Logical | 2 | 3 | 0 | 2 |
| Functional | 4 | 4 | 2 | 2 |
| Temporal | 0 | 2 | 0 | 0 |
| Spatial | 0 | 5 | 0 | 0 |

FIG. 9

SYSTEM AND METHOD FOR PRESERVATION OF DIGITAL RECORDS

CROSS-REFERENCE TO RELATED APPLICATIONS

This application claims priority under 35 U.S.C. §119(e)(1) to U.S. Application 60/802,875, filed May 24, 2006, and 60/797,754, filed May 5, 2006, each of which is incorporated herein by reference in its entirety.

FIELD OF THE INVENTION

The example embodiments disclosed herein relate to systems and methods for preservation of digital records.

BACKGROUND OF THE INVENTION

Since the earliest history, various institutions (e.g., governments and private companies alike) have recorded their actions and transactions. Subsequent generations have used these archival records to understand the history of the institution, the national heritage, and the human journey. These records may be essential to support the efficiency of the institution, to protect the rights of individuals and businesses, and/or to ensure that the private company or public corporation/company is accountable to its employees/shareholders and/or that the Government is accountable to its citizens.

With the advance of technology into a dynamic and unpredictable digital era, evidence of the acts and facts of institutions and the government and our national heritage are at risk of being irrecoverably lost. The challenge is pressing—as time moves forward and technologies become obsolete, the risks of loss increase. It will be appreciated that a need has developed in the art to develop an electronic records archives system and method especially, but not only, for the National Archives and Records Administration (NARA) in a system known as Electronic Records Archives (ERA), to resolve this growing problem, in a way that is substantially obsolescence-proof and policy neutral.

Several organizations and governing bodies have tried to solve the issue of digital preservation. The Victorian Electronics Records Strategy (VERS) developed by the Public Record Office of Victoria (PROV) Australia mandated that a single format (e.g. PDF-A) be used as the universal format for preserving digital records. However, this imposes a format limitation that is not practical when the behavior of an object is an essential characteristic.

While embodiments of the invention will be described with respect to its application for safeguarding government records, the described embodiments are not limited to archives systems applications nor to governmental applications and can also be applied to other large scale storage applications, in addition to archives systems, and for businesses, charitable (e.g., non-profit) and other institutions, and entities.

An aspect of the ERA according to the present invention is to preserve and to provide ready access to authentic electronic records of enduring value.

In one aspect, the ERA supports and flows from NARA's mission to ensure "for the Citizen and the Public Servant, for the President and the Congress and the Courts, ready access to essential evidence." This mission facilitates the exchange of vital ideas and information that sustains the United States of America. NARA is responsible to the American people as the custodian of a diverse and expanding array of evidence of America's culture and heritage, of the actions taken by public servants on behalf of American citizens, and of the rights of American citizens. The core of NARA's mission is that this essential evidence must be identified, preserved, and made available for as long as authentic records are needed—regardless of form.

The creation and use of an unprecedented and increasing volume of Federal electronic records—in a wide variety of formats, using evolving technologies—poses a problem that the ERA must solve. An aspect of the present invention involves an integrated ERA solution supporting NARA's evolving business processes to identify, preserve, and make available authentic, electronic records of enduring value—for as long as they are needed.

In another aspect, the ERA can be used to store, process, and/or disseminate a private institution's records. That is, the ERA may store records pertaining to a private institution or association, and/or the ERA may be used by a first entity to store the records of a second entity. System solutions, no matter how elegant, may be integrated with the institutional culture and organizational processes of the users.

Since 1934, NARA has developed effective and innovative processes to manage the records created or received, maintained or used, and destroyed or preserved in the course of public business transacted throughout the Federal Government. NARA played a role in developing this records lifecycle concept and related business processes to ensure long-term preservation of, and access to, authentic archival records. NARA also has been instrumental in developing the archival concept of an authentic record that consists of four fundamental attributes: content, structure, context, and presentation.

NARA has been managing electronic records of archival value since 1968, longer than almost anyone in the world. Despite this long history, the diverse formats and expanding volume of current electronic records pose new challenges and opportunities for NARA as it seeks to identify records of enduring value, preserve these records as vital evidence of our nation's past, and make these records accessible to citizens and public servants in accordance with statutory requirements.

The ERA should support, and may affect, the institution's (e.g., NARA's) evolving business processes. These business processes mirror the records lifecycle and are embodied in the agency's statutory authority:

Providing guidance to Federal Agencies regarding records creation and records management;
Scheduling records for appropriate disposition;
Storing and preserving records of enduring value; and/or
Making records available in accordance with statutory and regulatory provisions.

Within this lifecycle framework, the ERA solution provides an integrated and automated capability to manage electronic records from: the identification and capture of records of enduring value; through the storage, preservation, and description of the records; to access control and retrieval functions.

Developing the ERA involves far more than just warehousing data. For example, the archival mission is to identify, preserve, and make available records of enduring value, regardless of form. This three-part archival mission is the core of the Open Archival Information System (OAIS) Reference Model, expressed as ingest, archival storage, and access. Thus, one ERA solution is built around the generic OAIS Reference Model (presented in FIG. 1), which supports these core archival functions through data management, administration, and preservation planning.

The ERA may coordinate with the front-end activities of the creation, use, and maintenance of electronic records by Federal officials. This may be accomplished through the implementation of disposition agreements for electronic records and the development of templates or schemas that define the content, context, structure, and presentation of electronic records along with lifecycle data referring to these records.

The ERA solution may complement NARA's other activities and priorities, e.g., by improving the interaction between NARA staff and their customers (in the areas of scheduling, transfer, accessioning, verification, preservation, review and redaction, and/or ultimately the ease of finding and retrieving electronic records).

Like NARA itself, the scope of ERA includes the management of electronic and non-electronic records, permanent and temporary records, and records transferred from Federal entities as well as those donated by individuals or organizations outside of the government. Each type of record is described and/or defined below.

ERA and Non-Electronic Records: Although the focus of ERA is on preserving and providing access to authentic electronic records of enduring value, the system's scope also includes, for example, management of specific lifecycle activities for non-electronic records. ERA will support a set of lifecycle management processes (such as those used for NARA) for appraisal, scheduling, disposition, transfer, accessioning, and description of both electronic and non-electronic records. A common systems approach to appraisal and scheduling through ERA will improve the efficiency of such tasks for non-electronic records and help ensure that permanent electronic records are identified as early as possible within the records lifecycle. This same common approach will automate aspects of the disposition, transfer, accessioning, and description processes for all types of records that will result in significant workflow efficiencies. Archivists, researchers, and other users may realize benefits by having descriptions of both electronic and non-electronic records available together in a powerful, universal catalog of holdings. In an embodiment, some of ERA's capabilities regarding non-electronic records may come from subsuming the functionality of legacy systems such as the Archival Research Catalog (ARC). To effectively manage lifecycle data for all types of records, in certain embodiments, ERA also may maintain data interchange (but not subsume) other legacy systems and likely future systems related to non-electronic records.

Permanent and Temporary Records: There is a fundamental archival distinction between records of enduring historic value, such as those that NARA must retain forever (e.g., permanent records) and those records that a government must retain for a finite period of time to conduct ongoing business, meet statutory and regulatory requirements, or protect rights and interests (e.g., temporary records).

For a particular record series from the U.S. Federal Government, NARA identifies these distinctions during the record appraisal and scheduling processes and they are reflected in NARA-approved disposition agreements and instructions. Specific records are actually categorized as permanent or temporary during the disposition and accessioning processes. NARA takes physical custody of all permanent records and some temporary records, in accordance with approved disposition agreements and instructions. While all temporary records are eventually destroyed, NARA ultimately acquires legal (in addition to physical) custody over all permanent records.

ERA may address the distinction between permanent and temporary records at various stages of the records life-cycle. ERA may facilitate an organization's records appraisal and scheduling processes where archivists and transferring entities may use the system to clearly identify records as either permanent or temporary in connection with the development and approval of disposition agreements and instructions. The ERA may use this disposition information in association with the templates to recognize the distinctions between permanent and temporary records upon ingest and manage these records within the system accordingly.

For permanent records this may involve transformation to persistent formats or use of enhanced preservation techniques to insure their preservation and accessibility forever. For temporary records, NARA's Records Center Program (RCP) is exploring offering its customers an ERA service to ingest and store long-term temporary records in persistent formats. To the degree that the RCP opts to facilitate their customers' access to the ERA for appropriate preservation of long-term temporary electronic records, this same coordination relationship with transferring entities through the RCP will allow NARA to effectively capture permanent electronic records earlier in the records lifecycle. In the end, ERA may also provide for the ultimate destruction of temporary electronic records.

ERA and Donated Materials: In addition to federal records, NARA also receives and accesses donated archival materials. Such donated collections comprise a significant percentage of NARA's Presidential Library holdings, for example. ERA may manage donated electronic records in accordance with deeds of gift of deposit agreements which, when associated with templates, may ensure that these records are properly preserved and made available to users. Although donated materials may involve unusual disposition instructions or access restrictions, ERA should be flexible enough to adapt to these requirements. Since individuals or institutions donating materials to NARA are likely to be less familiar with ERA than federal transferring entities, the system may also include guidance and tools to help donors and the NARA appraisal staff working with them insure proper ingest, preservation, and/or dissemination of donated materials.

Systems are designed to facilitate the work of users, and not the other way around. One or more of the following illustrative classes of users may interact with the ERA: transferring entity; appraiser; records processor; preserver; access reviewer; consumer; administrative user; and/or a manager. The ERA may take into account data security, business process re-engineering, and/or systems development and integration. The ERA solution also may provide easy access to the tools the users need to process and use electronic records holdings efficiently.

NARA must meet challenges relating to archival of massive amounts of information, or the American people risk losing essential evidence that is only available in the form of electronic federal records. But beyond mitigating substantial risks, the ERA affords such opportunities as:

Using digital communication tools, such as the Internet, to make electronic records holdings, such as NARA's, available beyond the research room walls in offices, schools, and homes throughout the country and around the world;

Allowing users to take advantage of the information-processing efficiencies and capabilities afforded by electronic records;

Increasing the return on the public's investment by demonstrating technological solutions to electronic records problems that will be applied throughout our digital society in a wide variety of institutional settings; and/or Developing tools for archivists to perform their functions more efficiently.

The challenges faced by NARA are typical of broader archival problems and reveal drawbacks associated with known solutions. Thus, in an embodiment, an ERA may be provided to address some or all of the more general problems. In particular, archives systems exist for storing and preserving electronic assets, which are stored as digital data. Typically, these assets are preserved for a period of time (retention time) and then deleted. These systems maintain metadata about the assets in asset catalogs to facilitate asset management. Such metadata may include one or more of the following:

Attributes to uniquely identify assets;
Attributes to describe assets;
Attributes to facilitate search through the archives;
Attributes to define asset structure and relationships to other assets;
Attributes to organize assets;
Attributes for asset protection;
Attributes to maintain information about asset authenticity; and/or
Status of the asset lifecycle (e.g., planning receipt of asset through eventual deletion).

Unfortunately, these systems all suffer from several drawbacks. For example, there are limitations relating to the scale of the assets managed and, in particular, the size and number of all the assets maintained. These systems also have practical limitations in the duration in which they retain assets. Typically, archives systems are designed to retain data for years or sometimes decades, but not longer. As retention times of assets become very long or indefinite, longevity of the archives system itself, as well as the assets archived, is needed because an archives system's basic requirement is to preserve assets.

Indefinite longevity of an archives system and its assets pose challenges. For example, providing access to old electronic assets is complicated by obsolescence of the asset's format. Regular upgrades of the archives system itself, including migrations of asset data and/or metadata to new storage systems is complicated by extreme size of the assets managed, e.g., if the metadata has to be redesigned to handle new required attributes or to handle an order of magnitude greater number of assets than supported by the old design, then the old metadata generally will have to be migrated to the new design, which could entail a great deal of migration. Extreme scale and longevity make impractical archives systems that are not designed to accommodate unknown, future changes and reduce the impact of necessary change as much as possible.

Archives systems today are built on top of underlying storage systems based on commercial products that are typically comprised of file systems (e.g., Sun's ZFS file system) or relational databases (e.g., Oracle), and sometimes proprietary systems (e.g., EMC Centera). All of these storage systems have limitations in terms of scale (though sometimes the limits can be quite high). In some cases, there may be no products that can make use of the full scale of available file systems. Few of these systems can scale to trillions of entries (e.g., files). Limitations arise for different reasons but can be related to one or more of the following factors, alone or in combination:

Limitations of object or file identification schemes (e.g., uniqueness of identifiers. www.doi.org provides background on the state of the art for electronic/digital entity identifiers);

Catalog limitations (e.g., number of entries, design bottlenecks);

The number of storage subsystems that can be integrated (sometimes termed horizontal scalability);

The capacity of underlying storage technologies;

Search and retrieval performance considerations (e.g., search can become impractical with extreme size);

The ability to distribute system components (e.g., systems can be difficult to distribute geographically); and/or Limitations of system maintenance tasks that are a function of system size (e.g., systems can become impractical to administer with extreme size).

Currently, relational databases (DBs) can scale only to 10 billion objects per instance. Relational DBs also generally do not perform as well as file systems for simple search and retrieval function tasks because they tend to introduce additional overhead to meet other requirements such as fine-grained transactional integrity. There is also no viable product that integrates multiple file systems in a way that provides both extreme scaling and longevity suitable for an archives file system.

SUMMARY OF THE INVENTION

According to an embodiment of the invention, a method for digitally preserving an electronic record comprises defining a preservation and service plan for the electronic record in a model, the preservation and service plan including access requirements and authenticity requirements for a digital adaptation of the electronic record, and characteristics of the electronic record to be preserved in the digital adaptation of the electronic record, the model assigning a numeric value to each requirement and characteristic and to the relative importance of each requirement and characteristic; for each data type included in the electronic record, assigning a score to each digital adaptation process that supports the data type, the score being indicative of the ability of the digital adaptation process to meet the access and authenticity requirements and preserve the characteristics as valued in the model; and comparing the scores to determine the digital adaptation process that most closely matches the model.

According to another embodiment of the invention, an electronic record archive comprises a preservation and service plan management package configured to create, retrieve, modify and/or delete a preservation and service plan for an electronic record, the preservation and service plan including access requirements and authenticity requirements for a digital adaptation of the electronic record, and characteristics of the electronic record to be preserved in the digital adaptation of the electronic record; a digital adaptation package comprising a plurality of digital adaptation processors, each digital adaptation processor configured to digitally adapt a data type; and a preservation processing package comprising a model of the preservation and service plan, the model assigning a numeric value to each requirement and characteristic and to the relative importance of each requirement and characteristic, the preservation processing package being configured to assign a score to each digital adaptation process that supports a data format, the score being indicative of the ability of the digital adaptation process to meet the access and authenticity requirements and preserve the characteristics as valued in the model, and being further configured to compare the scores to determine the digital adaptation process that most closely matches the model.

It will be appreciated that the above-described aspects and embodiments, and the elements thereof, may be used alone or in various combinations to realize yet further embodiments.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

FIGS. 6A-6D illustrate a schema for a data type profile usable with the present invention;

FIG. 7 illustrates a Preservation Objective Model (POM) according to an embodiment of the present invention;

FIG. 9 illustrates a comparison of two digital adaptation processors using the POM of the present invention.

DETAILED DESCRIPTION

The following description includes several examples and/or embodiments of computer-driven systems and/or methods for carrying out automated information storage, processing and/or access. In particular, the examples and embodiments are focused on systems and/or methods oriented specifically for use with the U.S. National Archives and Records Administration (NARA). However, it will be recognized that, while one or more portions of the present specification may be limited in application to NARA's specific requirements, most if not all of the described systems and/or methods have broader application. For example, the implementations described for storage, processing, and/or access to information (also sometimes referred to as ingest, storage, and dissemination) can also apply to any institution that requires and/or desires automated archiving and/or preservation of its information, e.g., documents, email, corporate IP/knowledge, etc. The term "institution" includes at least government agencies or entities, private companies, publicly traded corporations, universities and colleges, charitable or non-profit organizations, etc. Moreover, the term "electronic records archive" (ERA) is intended to encompass a storage, processing, and/or access archives for any institution, regardless of nature or size.

Figure 1:
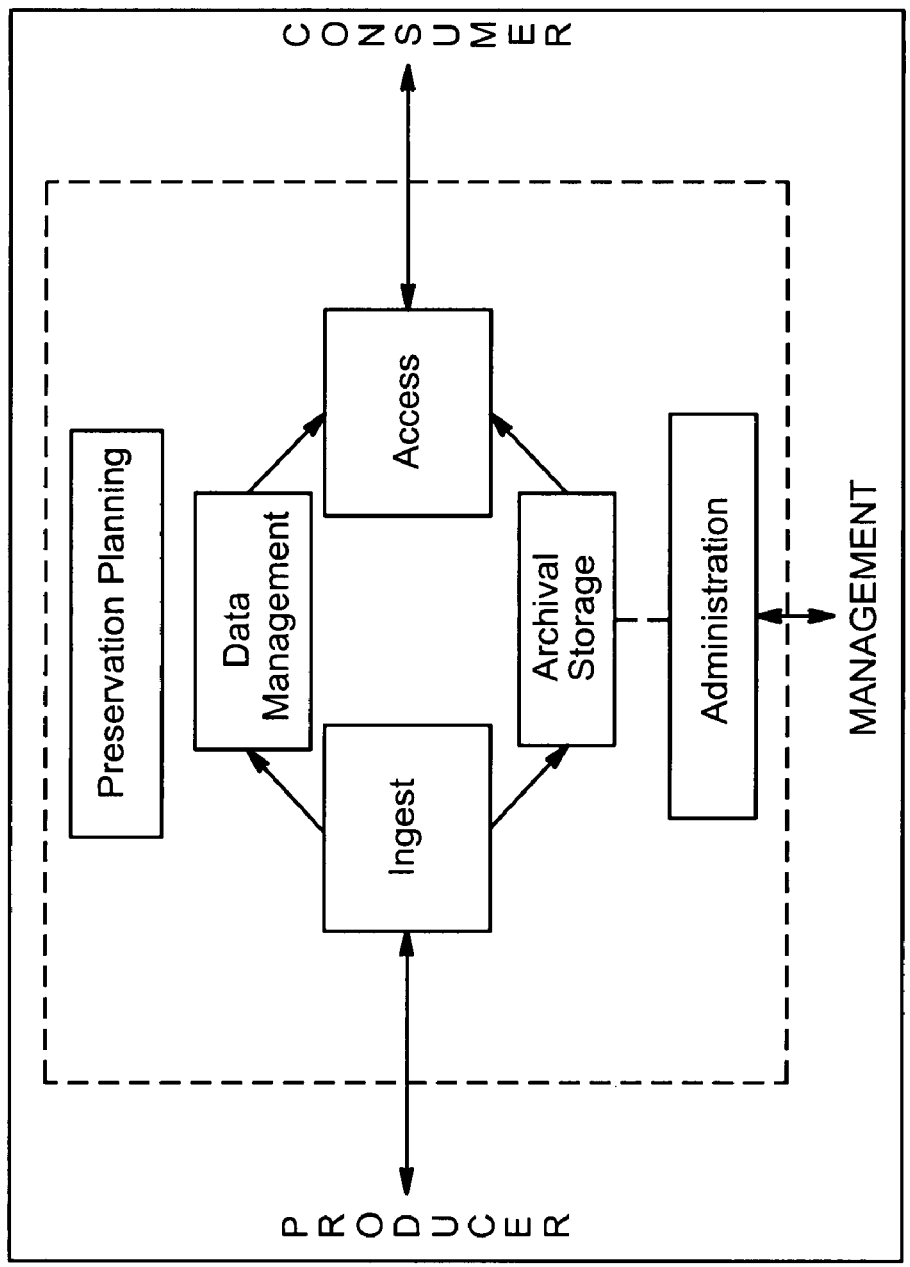
FIG. 1 illustrates an archives system according to the present invention.
Figure 2:
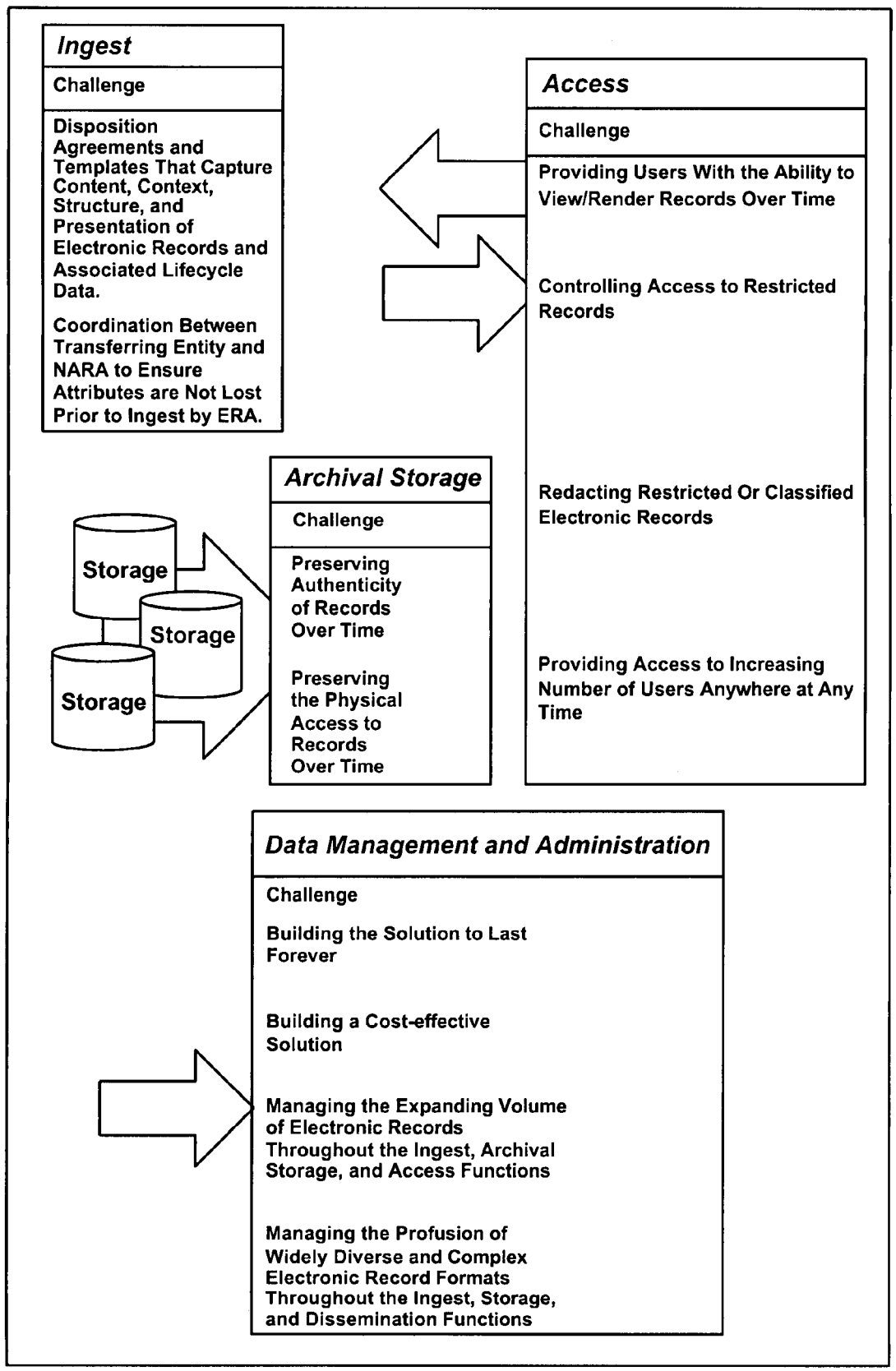
FIG. 2 is a chart demonstrating challenges and solutions related to certain illustrative aspects of the present invention.

As one example, NARA's continuing fulfillment of its mission in the area of electronic records presents new challenges and opportunities, and the embodiments described herein that relate to the ERA and/or asset preservation may help NARA fulfill its broadly defined mission. The underlying risk associated with failing to meet these challenges or realizing these opportunities is the loss of evidence that is essential to sustaining a government's or an institution's needs. FIG. 2 relates specific electronic records challenges to the components of the OAIS Reference Model (ingest, archival storage, access, and data management/administration), and summarizes selected relevant research areas.

At Ingest—the ERA needs to identify and capture all components of the record that are necessary for effective storage and dissemination (e.g., content, context, structure, and presentation). This can be especially challenging for records with dynamic content (e.g., websites or databases).

Archival Storage—Recognizing that in the electronic realm the logical record is independent of its media, the four illustrative attributes of the record (e.g., content, context, structure, and presentation) and their associated metadata, still must be preserved "for the life of the Republic."

Access—NARA will not fulfill its mission simply by storing electronic records of archival value. Through the ERA, these records will be used by researchers long after the associated application software, operating system, and hardware all have become obsolete. The ERA also may apply and enforce access restrictions to sensitive information while at the same time ensuring that the public interest is served by consistently removing access restrictions that are no longer required by statute or regulation.

Data Management—The amount of data that needs to be managed in the ERA can be monumental, especially in the context of government agencies like NARA. Presented herewith are embodiments that are truly scalable solutions that can address a range of needs—from a small focused Instance through large Instances. In such embodiments, the system can be scaled easily so that capacity in both storage and processing power is added when required, and not so soon that large excess capacities exist. This will allow for the system to be scaled to meet demand and provide for maximum flexibility in cost and performance to the institution (e.g., NARA).

Satisfactorily maintaining authenticity through technology-based transformation and re-representation of records is extremely challenging over time. While there has been significant research about migration of electronic records and the use of persistent formats, there has been no previous attempt to create an ERA solution on the scale required by some institutions such as NARA.

Migrations are potentially loss-full transformations, so techniques are needed to detect and measure any actual loss. The system may reduce the likelihood of such loss by applying statistical sampling, based on human judgment for example, backed up with appropriate software tools, and/or institutionalized in a semi-automatic monitoring process.

Table 1 summarizes the "lessons learned" by the Applicants from experience with migrating different types of records to a Persistent Object Format (POF).

TABLE 1

| Type of record | Current Migration Possibilities |
| --- | --- |
| E-mail | The Dutch Testbed project has shown that e-mail can be successfully migrated to a POF. An XML-based POF was designed by Tessella as part of this work. Because e-mail messages can contain attached files in any format, an e-mail record should be preserved as a series of linked objects: the core message, including header information and message text, and related objects representing attachments. These record relationships are stored in the Record Catalog. Thus, an appropriate preservation strategy can be chosen and applied to each file, according to its type. |

TABLE 1-continued

| Type of record | Current Migration Possibilities |
| --- | --- |
| Word processing documents | Simple documents can be migrated to a POF, although document appearance can be complex and may include record characteristics. Some documents can also include other embedded documents which, like e-mail attachments, can be in any format. Documents can also contain macros that affect "behavior" and are very difficult to deal with generically. Thus, complex documents currently require an enhanced preservation strategy.<br>Adobe's Portable Document Format (PDF) often has been treated as a suitable POF for Word documents, as it preserves presentation information and content. The PDF specification is controlled by Adobe, but it is published, and PDF readers are widely available, both from Adobe and from third-parties. ISO are currently developing, with assistance from NARA, a standard version of PDF specifically designed for archival purposes (PDF/A). This format has the benefit that it forces some ambiguities in the original to be removed. However, both Adobe and Microsoft are evolving towards using native XML for their document formats. |
| Images | TIFF is a widely accepted open standard format for raster images and is a good candidate in the short to medium term for a POF. For vector images, the XML-based Scalable Vector Graphics format is an attractive option, particularly as it is a W3C open standard. |
| Databases | The contents of a database should be converted to a POF rather than being maintained in the vendor's proprietary format. Migration of the contents of relational database tables to an XML or flat file format is relatively straightforward. However, in some cases, it is also desirable to represent and/or preserve the structure of the database. In the Dutch Digital Preservation Testbed project, this was achieved using a separate XML document to define the data types of columns, constraints (e.g., whether the data values in a column must be unique), and foreign key relationships, which define the inter-relationships between tables. The Swiss Federal Archives took a similar approach with their SIARD tool, but used SQL statements to define the database structure. Major database software vendors have taken different approaches to implementing the SQL "standard" and add extra non-standard features of their own. This complicates the conversion to a POF.<br>Another difficulty is the Binary Large Object (BLOB) datatype, which presents similar problems to those of e-mail attachments: any type of data can be stored in a BLOB and in many document-oriented databases, the majority of the important or relevant data may be in this form. In this case, separate preservation strategies may be applied according to the type of data held.<br>A further challenge with database preservation is that of preserving not only the data, but the way that the users created and viewed the data. In some cases this may be depend on stored queries and stored procedures forming the database; in others it may depend on external applications interacting with the database. To preserve such "executable" aspects of the database "as a system" is an area of ongoing research. |
| Records with a high degree of "behavioral" properties (e.g., virtual reality models) | For this type of record, it is difficult to separate the content from the application in which it was designed to operate. This makes these records time-consuming to migrate to any format. Emulation is one approach, but this approach is yet to be fully tested in an archival environment. Migration to a POF is another approach, and more research is required into developing templates to support this. |
| Spreadsheets | The Dutch Testbed project examined the preservation of spreadsheets and concluded that an XML-based POF was the best solution, though did not design the POF in detail. The structured nature of spreadsheet data means that it can be mapped reliably and effectively to an XML format. This approach can account for cell contents, the majority of appearance related issues (cell formatting, etc), and formulae used to calculate the contents of some cells. The Testbed project did not address how to deal with macros: most spreadsheet software products include a scripting or programming language to allow very complex macros to be developed (e.g., Visual Basic for Applications as part of Microsoft Excel). This allows a spreadsheet file to contain a complex software application in addition to the data it holds. This is an area where further research is necessary, though it probably applies to only a small proportion of archival material. |
| Web sites | Most Web sites include documents in standardized formats (e.g., HTML). However, it should be noted that there are a number of types of HTML documents, and many Web pages will include incorrectly formed HTML that nonetheless will be correctly displayed by current browsers. The structural relationship between the different files in a web-site should be maintained. The fact that most web-sites include external as well as internal links should be managed in designing a POF for web-sites. The boundary of the domain to be archived should be defined and an approach decided on for how to deal with links to files outside of that domain.<br>Many modern web sites are actually applications where the navigation and formatting are generated dynamically from executed pages (e.g., Active Server Pages or Java Server Pages). The actual content, including the user's preferences on what content is to be presented, is managed in a database. In this case, there are no simple web pages to archive, as different users may be presented with different material at different times. This situation overlaps with our discussion above of databases and the applications which interact with them. |
| Sound and video | For audio streams, the WAV and AVI formats are the de facto standards and therefore a likely basis for POFs. For video, there are a number of MPEG formats in general use, with varying degrees of compression. While it is desirable that only lossless compression techniques are used for archiving, if a lossy compression was used in the original format it cannot be recaptured in a POF.<br>For video archives in particular, there is the potential for extremely large quantities of material. High quality uncompressed video streams can consume up to 100 GB per hour of video, so storage space is an issue for this record type. |

It is currently not possible to migrate a number of file formats in a way that will be acceptable for archival purposes. One aspect is to encourage the evolution and enhancement of third-party migration software products by providing a framework into which such commercial off-the-shelf (COTS) software products could become part of the ERA if they meet appropriate tests.

When an appropriate POF cannot be identified to reduce the chances of obsolescence, the format may need to be migrated to a non-permanent but more modern, proprietary format (this is known as Enhanced Preservation). Even POFs are not static, since they still need executable software to interpret them, and future POFs may need to be created that have less feature loss than an older format. Thus, the ERA may allow migrated files to be migrated again into a new and more robust format in the future. Through the Dutch Testbed Project, the Applicants have found that it is normally better to return to the original file(s) whenever such a re-migration occurs. Thus, when updating a record, certain example embodiments may revert to an original version of the document and migrate it to a POF accordingly, whereas certain other example embodiments may not be able to migrate the original document (e.g., because it is unavailable, in an unsupported format, etc.) and thus may be able to instead or in addition migrate the already-migrated file. Thus, in certain example embodiments, a new version of a record may be derived from an original version of the record if it is available or, if the original is not available, the new version may be derived from any other already existing derivative version (e.g., of the original). As such, an extensible POF for certain example embodiments may be provided.

In view of the above aspects of the OAIS Reference Model, the ERA may comprise an ingest module to accept a file and/or a record, a storage module to associate the file or record with information and/or instructions for disposition, and an access or dissemination module to allow selected access to the file or record. The ingest module may include structure and/or a program to create a template to capture content, context, structure, and/or presentation of the record or file. The storage module may include structure and/or a program to preserve authenticity of the file or record over time, and/or to preserve the physical access to the record or file over time. The access module may include structure or a program to provide a user with ability to view/render the record or file over time, to control access to restricted records, to redact restricted or classified records, and/or to provide access to an increasing number of users anywhere at any time.

Figure 3:
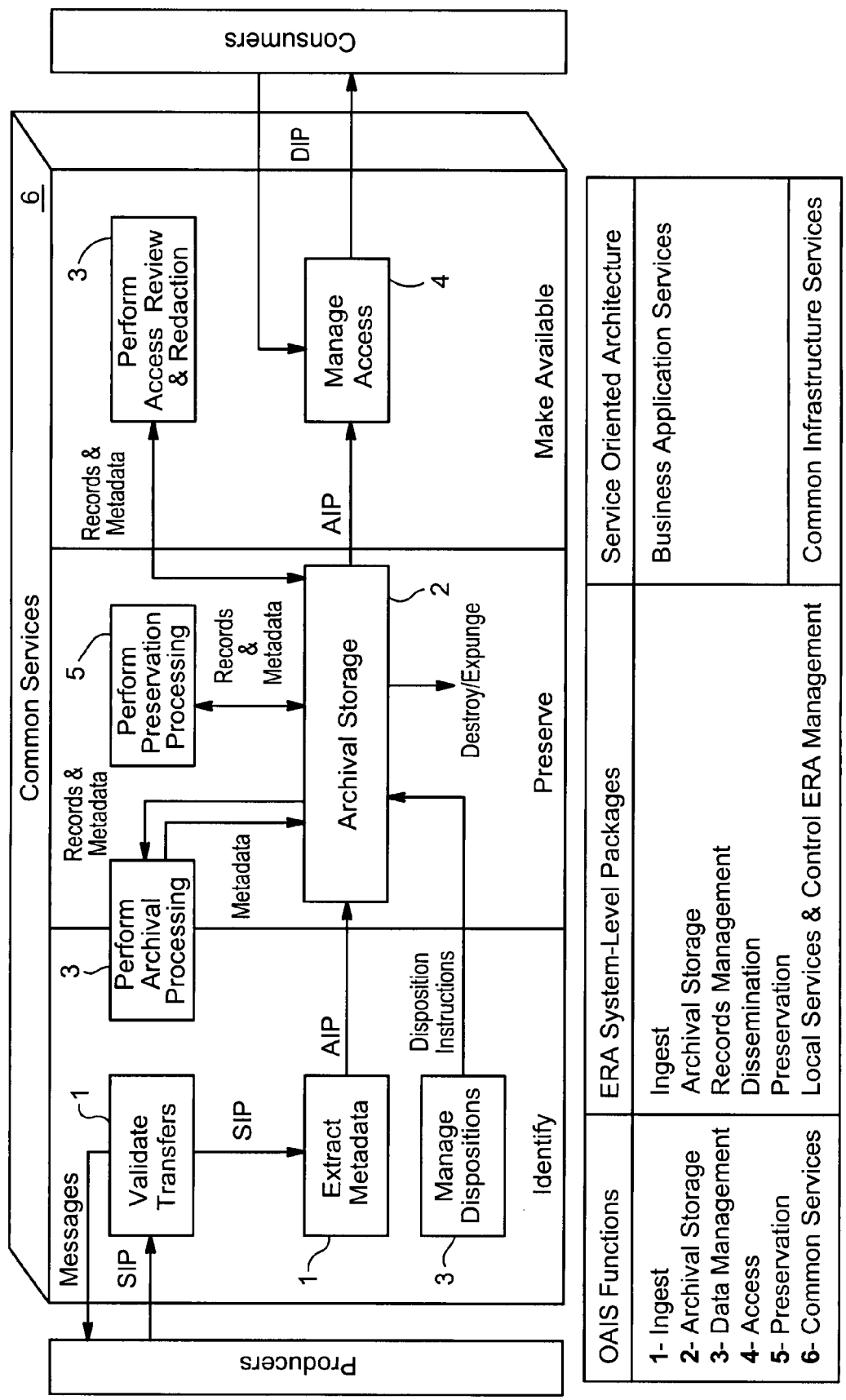
FIG. 3 illustrates the notional life cycle of records as they move through the ERA system, in accordance with an example embodiment of the present invention.

FIG. 3 illustrates the notional life cycle of records as they move through the ERA system, in accordance with an example embodiment. Records flow from producers, who are persons or client systems that provide the information to be preserved, and end up with consumers, who are persons or client systems that interact with the ERA to find preserved information of interest and to access that information in detail. The Producer also may be a "Transferring Entity."

During the "Identify" stage, producers and archivists develop a Disposition Agreement to cover records. This Disposition Agreement contains disposition instructions, and also a related Preservation and Service Plan. Producers submit records to the ERA System in a SIP. The transfer occurs under a pre-defined Disposition Agreement and Transfer Agreement. The ERA System validates the transferred SIP by scanning for viruses, ensuring the security access restrictions are appropriate, and checking the records against templates. The ERA System informs the Producer of any potential problems, and extracts metadata (including descriptive data, described in greater detail below), creates an Archival Information Package (or AIP, also described in greater detail below), and places the AIP into Archival Storage. At any time after the AIP has been placed into Archival Storage, archivists may perform Archival Processing, which includes developing arrangement, description, finding aids, and other metadata. These tasks will be assigned to archivists based on relevant policies, business rules, and management discretion. Archival processing supplements the Preservation Description Information metadata in the archives.

At any time after the AIP has been placed into Archival Storage, archivists may perform Preservation Processing, which includes transforming the records to authentically preserve them. Policies, business rules, Preservation and Service Plans, and management discretion will drive these tasks. Preservation processing supplements the Preservation Description Information metadata in the archives, and produces new (transformed) record versions.

With respect to the "Make Available" phase, at any time after the AIP has been placed into Archival Storage, archivists may perform Access Review and Redaction, which includes performing mediated searches, verifying the classification of records, and coordinating redaction of records where necessary. These tasks will be driven by policies, business rules, and access requests. Access Review and Redaction supplement the Preservation Description Information metadata in the archives, and produces new (redacted) record versions. Also, at any time after the AIP has been placed into Archival Storage, Consumers may search the archives to find records of interest.

Figure 4:
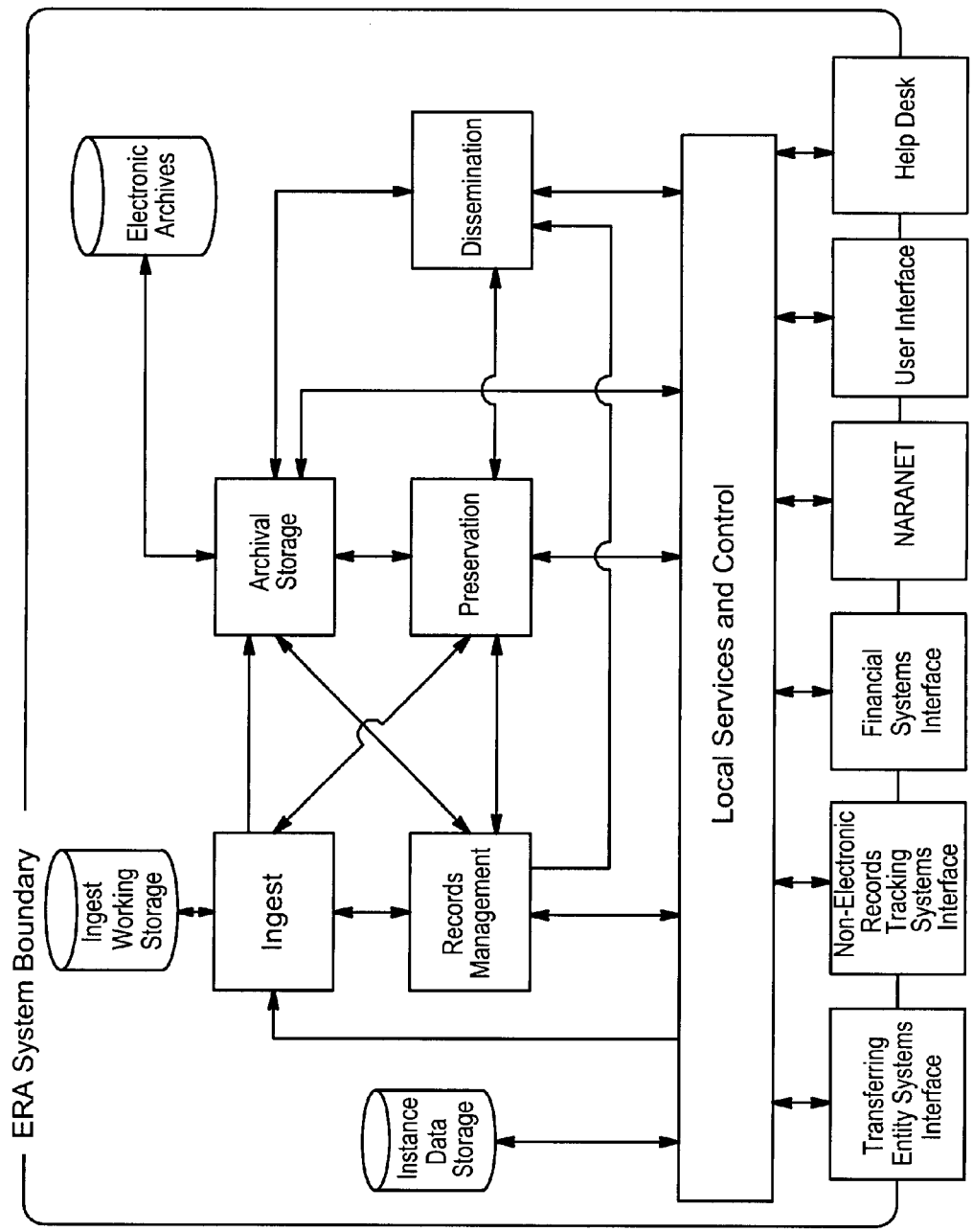
FIG. 4 illustrates the ERA System Functional Architecture from a notional perspective, delineating the system-level packages and external system entities, in accordance with an example embodiment of the present invention.

FIG. 4 illustrates the ERA System Functional Architecture from a notional perspective, delineating the system-level packages and external system entities, in accordance with an example embodiment. The rectangular boxes within the ERA System boundary represent the six system-level packages. The ingest system-level package includes the means and mechanisms to receive the electronic records from the transferring entities and prepares those electronic records for storage within the ERA System, while the records management system-level package includes the services necessary to manage the archival properties and attributes of the electronic records and other assets within the ERA System as well as providing the ability to create and manage new versions of those assets. Records Management includes the management functionality for disposition agreements, disposition instructions, appraisal, transfer agreements, templates, authority sources, records life cycle data, descriptions, and arrangements. In addition, access review, redaction, selected archival management tasks for non-electronic records, such as the scheduling and appraisal functions are also included within the Records Management service.

The Preservation system package includes the services necessary to manage the preservation of the electronic records to ensure their continued existence, accessibility, and authenticity over time. The Preservation system package also provides the management functionality for preservation assessments, Preservation and Service Level plans, authenticity assessment and digital adaptation of electronic records. Additional management functionality is provided for data type descriptors and digital adaptation descriptors. The Preservation system package also provides functionality for both manual and automated digital adaptation of records at any point in their lifecycles. Users will be able to make an assessment of the authenticity of both the digital adaptation process and its products. The Preservation system package further provides preservation processing services, including services for file data type identification and attribute extraction. The Preservation system package is described in more detail below with reference to Table 2 and FIG. 5.

The Archival Storage system-level package includes the functionality to abstract the details of mass storage from the rest of the system. This abstraction allows this service to be appropriately scaled as well as allow new technology to be introduced independent of the other system-level services according to business requirements. The Dissemination system-level package includes the functionality to manage search and access requests for assets within the ERA System. Users have the capability to generate search criteria, execute searches, view search results, and select assets for output or presentation. The architecture provides a framework to enable the use of multiple search engines offering a rich choice of searching capabilities across assets and their contents.

The Local Services and Control (LS&C) system-level package includes the functional infrastructure for the ERA Instance including a user interface portal, user workflow, security services, external interfaces to the archiving entity and other entities' systems, as well as the interfaces between ERA Instances. All external interfaces are depicted as flowing through LS&C, although the present invention is not so limited.

The ERA System contains a centralized monitoring and management capability called ERA Management. The ERA Management hardware and/or software may be located at an ERA site. The Systems Operations Center (SOC) provides the system and security administrators with access to the ERA management Virtual Local Area Network. Each SOC manages one or more Federations of Instances based on the classification of the information contained in the Federation.

Also shown are the three primary data stores for each Instance:

1. Ingest Working Storage—Contains transfers that remain until they are verified and placed into the Electronic Archives;
2. Electronic Archives—Contains all assets (e.g., disposition agreements, records, templates, descriptions, authority sources, arrangements, etc.); and
3. Instance Data Storage—Contains a performance cache of all business assets, operational data and the ERA asset catalog.

FIG. 4 provides a representative illustration of how a federated ERA system can be put together, though it will be appreciated that the same is given by way of example and without limitation. Also, FIG. 4 illustrates a collection of Instances at the same security classification level and compartment that can communicate electronically via a WAN with one another, although the present invention is not so limited.

The preservation framework of the present invention is a combination of preservation planning and preservation processing. Preservation planning includes a Preservation and Service Plan that defines the preservation objectives for a specific record type and provenance (e.g., context, chain of custody, proof of authenticity). Preservation planning is concerned with record types and their archival value. Preservation processing is concerned with data files, i.e. actual records. The preservation framework of the present invention permits a programmatic determination of the best fit between the preservation objectives and preservation processing capabilities, while recognizing that not all preservation objectives may be met.

The Preservation and Service Plan is a policy decision that reflects a strategy to ensure future access for electronic records of a specific type and a specific provenance. The Preservation and Service Plan will indicate whether the electronic record(s) should undergo preservation or not. This decision is the result of an assessment by an archivist based on the status of the record (temporary or permanent), the archival value of the records and the threat from technological obsolescence. The decision will either be 1) always perform preservation processing, 2) only perform if there is a threat of technological obsolescence, or 3) never perform preservation processing.

Preservation planning strategies will include a range of options from preserving the bit streams of the data files of the original electronic record to creating entirely new persistent formats to ensure future access. The design of preservation planning should be to ensure consistent preservation processing for all records of a given type independent of the data types that constitute the record. The preservation planning design according to the present invention allows for preservation planning to be defined in terms of record types and not the underlying data types of the electronic record. This is achieved by creating a default Preservation and Service Plan (i.e., template) for each record type for a given provenance (as defined in the authority source for record types).

Preservation planning should support routine automated records processing as much as possible, while still providing the ability to define "exceptional" preservation processing for specific records. The use of the default Preservation and Service Plan achieves this objective. A user may modify the default Preservation and Service Plan and apply it to such "exceptional" cases.

Table 2 includes preservation requirements and functionality for the Preservation system-level package that may be considered in designing the architecture.

TABLE 2

| Requirement/Functionality |
| --- |
| Preservation of electronic records |
| Manage the preservation processing of electronic records |
| Provide the capability for preservation assessments |
| Queue and initiate preservation processing |
| Preserve the integrity of records |
| Extract data file attributes |
| Identify relationships between records and data files |
| Perform digital adaptation |
| Perform digital adaptation to persistent formats |
| Store the resulting items from a digital adaptation |
| Support preservation planning |
| Provide a registry of data type descriptors |
| Provide a registry of digital adaptation descriptors |

Figure 5:
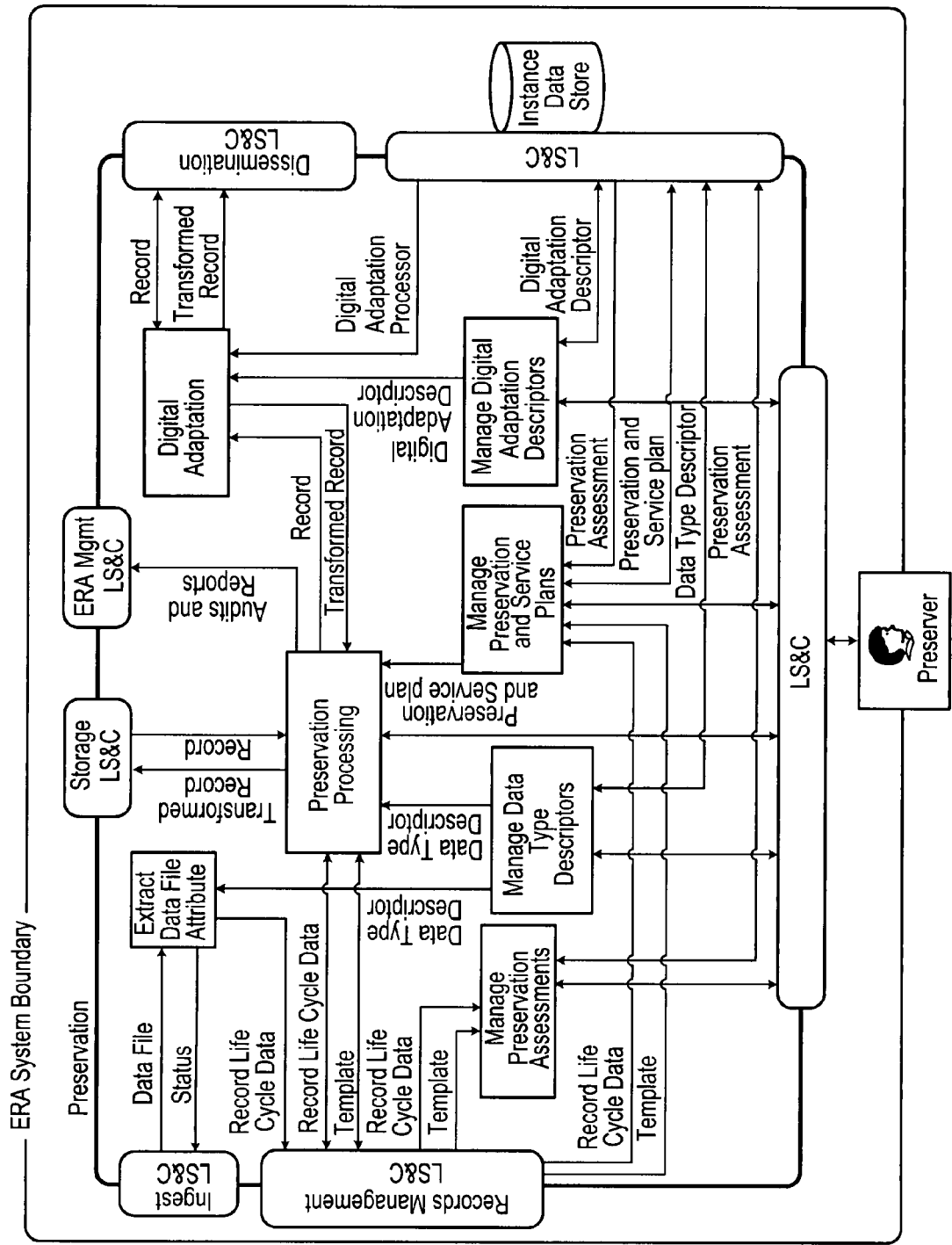
FIG. 5 illustrates the Preservation system-level package functional architecture according to an embodiment of the present invention.

FIG. 5 illustrates the Preservation system-level package functional architecture of the ERA System Functional Architecture of FIG. 4. The package includes two primary groups of services: Digital Adaptation and Registry management. Additional services for data file identification and attribute extraction are included as they are also associated with preservation. The interface to all other system-level packages is through the Local Services and Control (LS&C). The Preservation system-level package presents an architecture that is scalable, has a clear distinction and distribution of tasks to manage the preservation process, and is extensible to support multiple digital formats and unknown (e.g. later developed) technology.

The Preservation Processing package contains services to manage both manual and automatic digital adaptation of data types. Also included are services to allow a user to make an assessment on the authenticity of both a digital adaptation engine, and records that have undergone the digital adaptation process.

The Digital Adaptation package provides a framework for digital adaptation services, utilizing a range of digital adaptation engines as defined in the Digital Adaptation Descriptors. The Digital Adaptation package also provides services for the digital adaptation for presentation purposes.

The Manage Preservation Assessments package allows the review of electronic records to determine the potential need for preservation. The review may be performed at any point in the lifecycle of the records. The Manage Preservation Assessments package also provides for the creation, retrieval, modification, and deletion of a preservation assessment. Inputs to the package include templates, record lifecycle data and disposition agreements. Preservation assessments may then be used in the creation of a preservation and service plan.

The Manage Preservation and Service Plans package outlines the activities to be undertaken in the preservation of specific electronic records, and the level of service provided by the preservation authority, e.g. NARA. Services in the package are provided for the creation, retrieval, modification, and deletion of a preservation and service plan and to associate the preservation and service plan with electronic records.

Figure 6B:
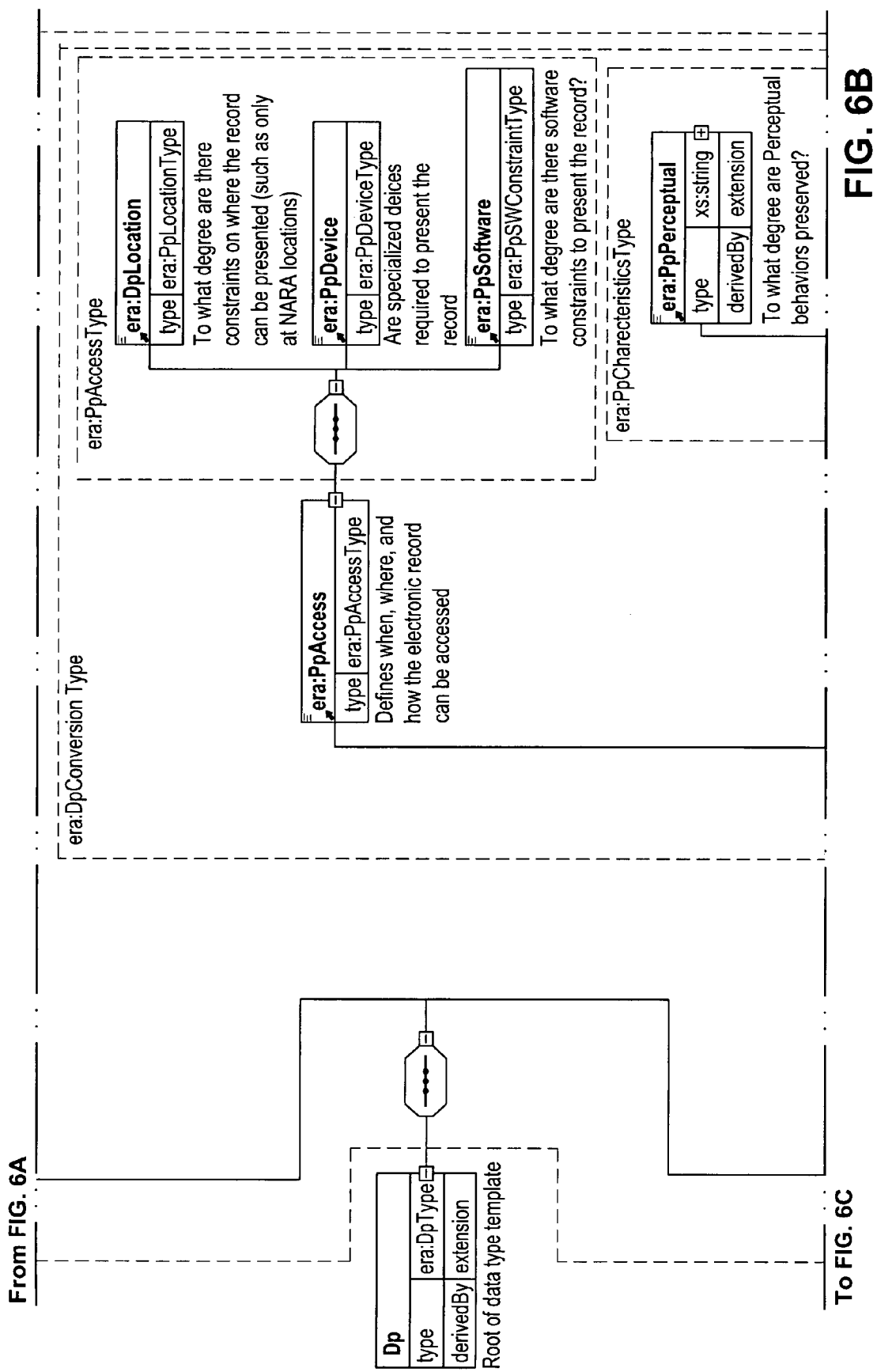
Figure 6C:
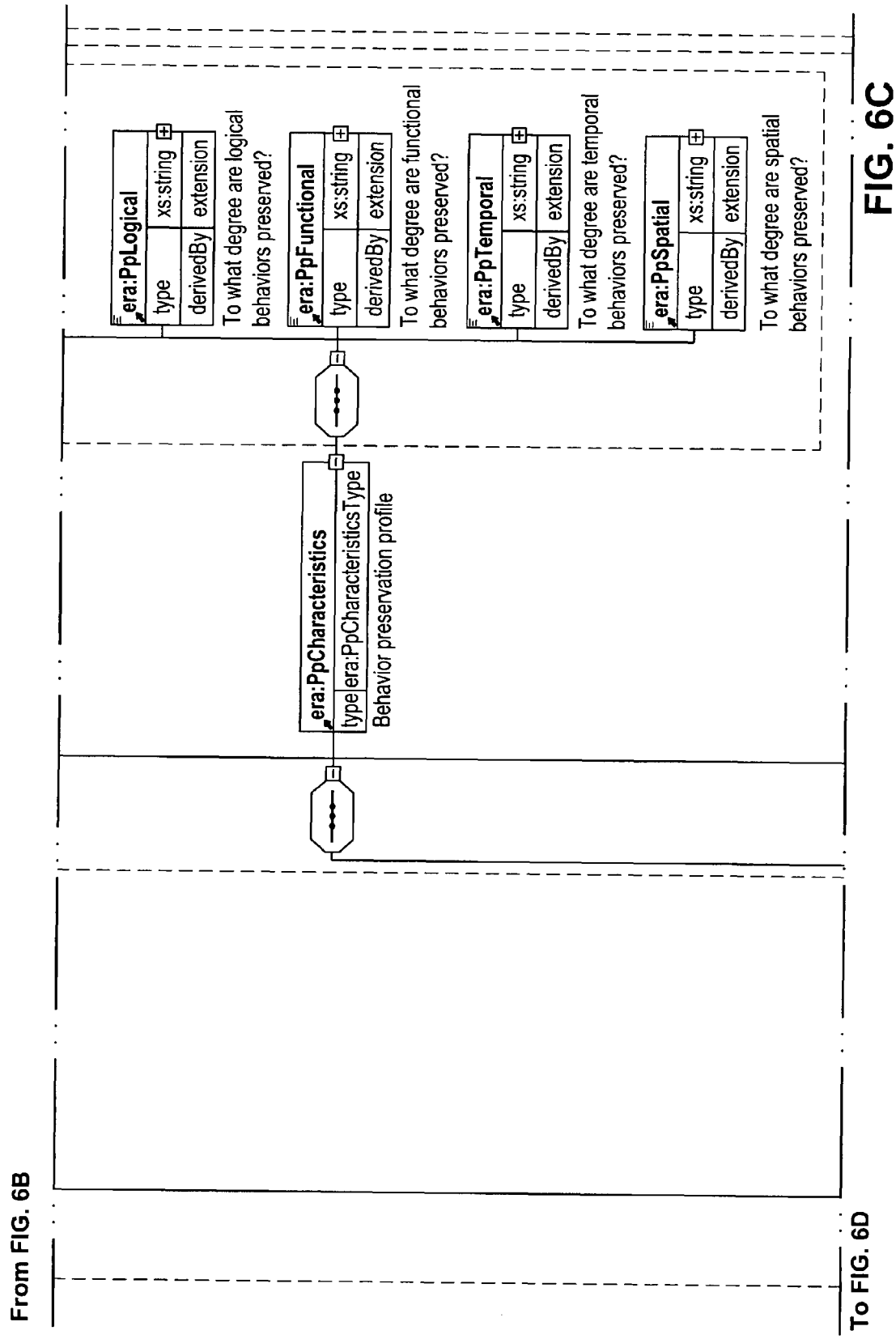
Figure 6D:
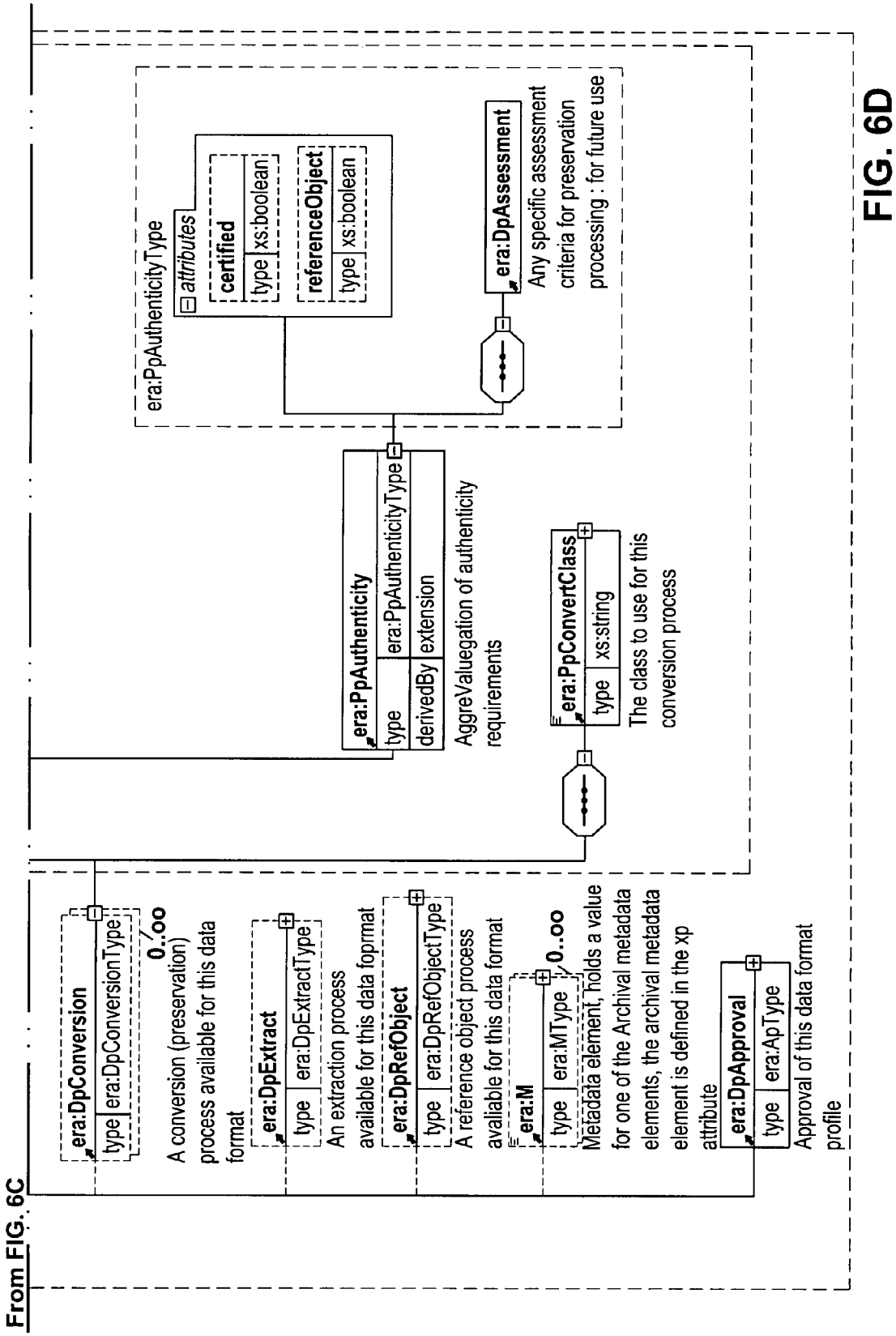

The Manage Data Type Descriptors package provides services for the creation, retrieval, modification, and deletion of data type descriptors. The data type profile includes information for the identification of data files, descriptive information about the format, and information for the ingest and preservation processing. FIG. 6 illustrates a schema for a data type profile usable with the present invention. The description of the data type is based upon, and builds on, work performed for the Global Digital Format Registry.

The Manage Digital Adaptation Descriptors package provides services for the creation, retrieval, modification, and deletion of digital adaptation descriptors.

The Extract Data File Attributes package provides services for the identification and extraction of data file attributes. This may include the identification of the data type itself. These services are normally called from the Ingest system package during the validation of a transfer. However, these services may also be included in the Preservation system package during the digital adaptation process.

The objective of the Preservation system package is to create digital adaptations of records so as to preserve access to those records over time, e.g. in perpetuity. Digital adaptations are needed to the extent that the original data files use formats that are subject to technological obsolescence, e.g. hardware obsolescence and/or software obsolescence. Access to such records would be lost if digital adaptation to accessible formats did not take place. Hence, it is necessary to digitally adapt the data files to formats which are persistent, i.e. likely to be accessible over a long period of time. Authenticity of the record requires representation of the electronic record in a manner that preserves its essential characteristics.

There are two primary strategies for preserving digital information: 1) migration of the digital record into a new manifestation using a digital adaptation processor or engine; and 2) the use of emulators to allow either the original application, or a similar application, to run against the data files on a modern computer environment. Each strategy has its limitations. Digital adaptation engines or processors take in data files in one format and create data files in a different format. The use of digital adaptation engines may include a loss of data during migration. The use of emulators does not provide sufficient preservation as generic emulators to render object behavior have not yet been developed. As suitable long-term preservation formats that address all essential characteristics have yet to be defined, at least one, if not multiple, formation transitions may be necessary over the lifecycle of a permanent archival record. Although the present invention provides a preservation framework that allows selection of the "best" digital adaptation engine for the format and essential characteristics of a record, as weighted by the preservation authority, it should be appreciated that the framework does not preclude the use of emulators to accomplish the preservation objectives as part of the framework.

A common, or consistent, preservation objective model (POM) is used to combine the preservation planning and preservation processing aspects of the preservation framework of the present invention. The informational content of an electronic record is a combination of data, such as text, and characteristics of the data file and the environment in which it is used, such as the font used or the text. Preservation of an electronic record may require preserving some, or all, of the characteristics of the original data file and its environment. Preservation planning defines which characteristics need to be preserved for the record to be considered authentic. These characteristics are the essential characteristics. As shown in FIG. 7, the essential characteristics may include, but are not limited to, perceptual, logical, spatial, temporal, and/or functional characteristics.

Perceptual characteristics are data embedded within a digital item that represent values which, when processed by the software that intercepts the data type, defines how a human subject would perceive the content of the digital item. Examples of perceptual characteristics include visual characteristics such as color, size, number of dimensions, location in visual space, perspective, and illumination. Other perceptual characteristics include audio (e.g., frequency, volume, acoustics), movement (e.g., 3-dimensional orientation, momentum, acceleration), touch (e.g., vibration, temperature, texture, pressure, hardness), smell and taste.

Logical characteristics are transformation to the content or presentation of the content of a digital item that could be optionally executed by a user in the original context that created the item. The logical behaviors are defined in processing instructions that are associated with a digital item, and my be embedded in the same data file as the digital item. Examples of logical characteristics include JavaScript embedded in a HTML page, an Applet, macros in desktop applications, and SQL queries.

Functional characteristics include functionality in the software or hardware that originally manipulated a digital object that defined how the user could interact with the object in its original context. These behaviors are inherent in the software or hardware that created or materialized the digital item, not in the item itself. There is no reference to the functional characteristics in the digital item and it may not be possible to infer them from the digital item. Examples of functional characteristics include sorting tabular data in a spreadsheet, manipulating the orientation of an architectural drawing, or selecting a scene at random in a movie on a DVD.

Temporal characteristics are the sequencing in time of the manifestation of digital items, as in an orchestration of sounds, the visualization of a sequence of images, or the intermittent appearance of an image. Examples include a multimedia presentation, such as a PowerPoint presentation, or a "Flash" application, where the timing of images and/or sounds is important.

Spatial characteristics include the location in 3-dimensional space, real or perceived, and which is defined in relation to a specified reference point, at which the manifestation of a digital item is intended to occur. A sound that should be perceived to come from behind and above the listener in a DVD recording is an example of a spatial characteristic.

It should be appreciated that the list of essential characteristics discussed above and below is merely illustrative and that each characteristic may subsequently include any number of constitutes, the presence of which are determined within each record type.

In addition to preserving the record, the preservation and service plan needs to also consider meeting service requirements, such as those defined in a service level agreement, e.g. between NARA and federal agencies. The service, or access, requirements may include information concerning the availability of the records (e.g., 24 hours a day), the locations for which the record can be accessed (e.g., Internet access point, NARA facility), their location within the Archival Storage (e.g., are they to be placed in the performance buffer) and any device and software dependencies.

In some cases, it may be necessary to certify that a presentation of a record that results from a digital adaptation of the original record represents an authentic, or certifiable, copy. It may also be necessary to create a reference object, or normative copy, from the original record to provide a reference against which to assess the fidelity of a the output of digital adaptation process. A normative copy is a simplistic version of a record in a format with a high probability of a long preservation life that may sacrifice some information captured in more comprehensive digital adaptations. A TIF of a GIS file is an example of a normative copy. Normative copies are captured at the time of ingest of the records and allow visual assessments of the quality of the transformation.

FIG. 7 illustrates a POM according to the invention. The POM for a specific data type is an aggregation of the essential characteristics, the service requirements, and the authenticity requirements. For each requirement within the POM, a numerical value is assigned for both the scale/degree of fidelity and its weight/relative importance. The determination as to whether a specific requirement has been met may be a yes or no (e.g. is a reference object created or not), or the determination may be represented on a scale of values (e.g. a 3 on a scale of 0-5).

As shown in FIG. 7, for the essential characteristics, a value of 0 indicates that the characteristic is of no importance. In other words, loss of this characteristic in a digital transformation by a digital adaptation processor or engine would not influence the authenticity of the record. A value of 1 indicates that the characteristic is of marginal information value and that loss of some or all of the characteristic is tolerable. A value of 2 indicates that the characteristic is useful, i.e., no loss of the characteristic is preferable. The value of 3 indicates that the characteristic is important, or that loss of the characteristic is acceptable in rare cases. A value of 4 indicates that the characteristic is critically important and that none of the characteristic may be lost during transformation to another format.

Preservation processing using the POM of FIG. 7 allows the implementation of user judgment to protect the content, context, structure, presentation, and/or behavior of records. The POM of FIG. 7 allows the preservation authority to define what the record needs to be for authentic preservation in terms of the essential characteristics, and the data format to describe how well each digital adaptation engine or process(or) preserves the essential characteristics. The POM defines the relationship between the pre-adaptation record content and the post adaptation file structures. Because the definition of the POM is consistent throughout all of the components of the preservation planning and processing, its structure is identical when used in the digital adaptation profile for the processor, the data type profile, and the preservation plan. Each digital adaptation engine or processor has a digital adaptation profile. The assessment of the processor's performance, i.e. "score," in meeting the preservation objective, as determined by the POM, becomes part of the digital adaptation processor's profile.

The ERA system of the present invention may use many digital adaptation processors, Each digital adaptation processor relates to a particular data format or type. There may also be more than one digital adaptation engines or processors available for the same data format. A registry of data type descriptors is used to delineate known data formats which include information needed to identify data files as being of each format, information about the provenance of each format, and a list of digital adaptation processors that support data files of each format. The registry also contains an assessment of how well the data type supports criteria for persistent object formats.

Figure 8:
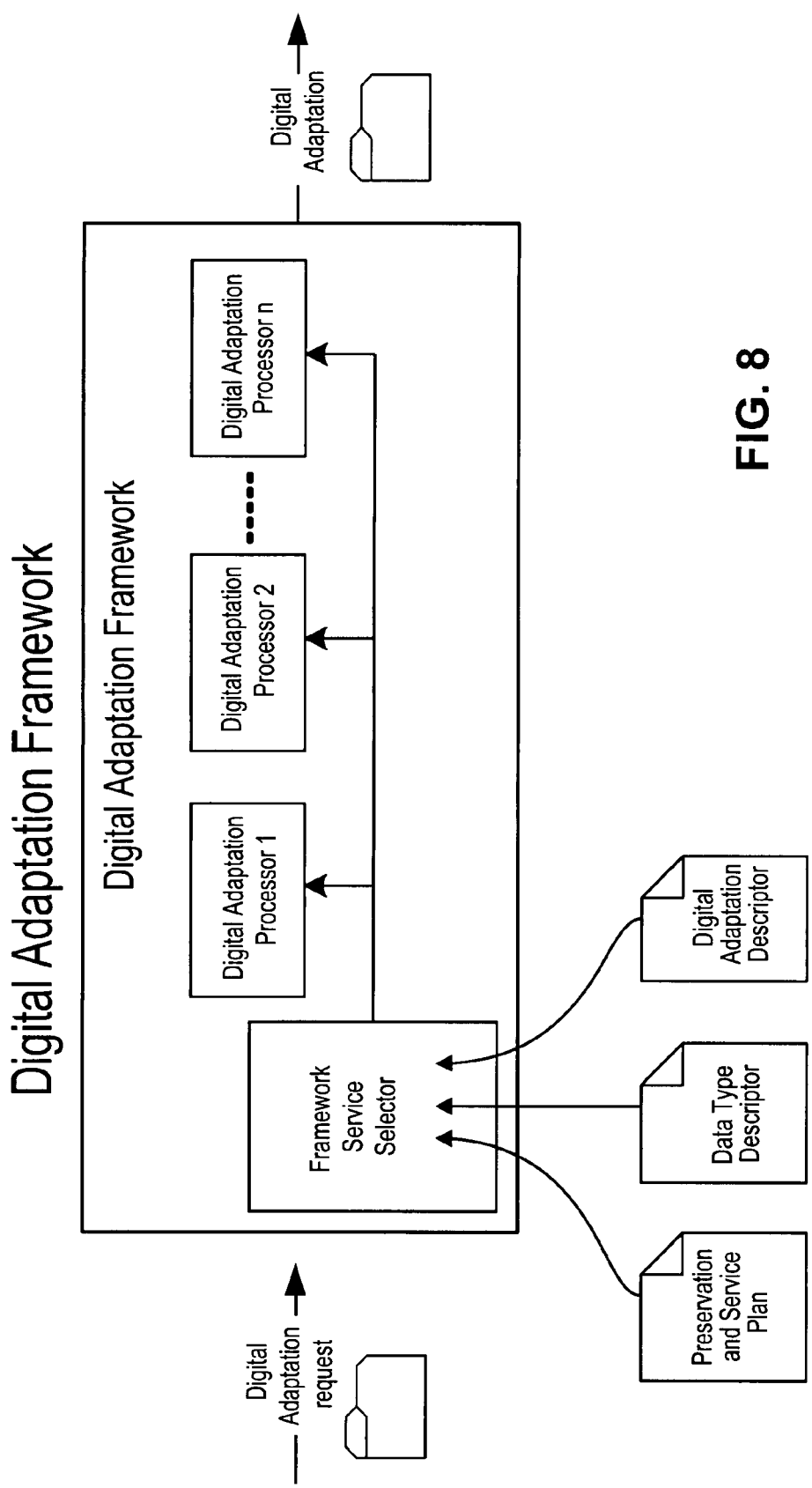
FIG. 8 illustrates a Digital Adaptation Framework according to an embodiment of the present invention.

The use of the POM and the registry allows the selection of the most appropriate, i.e. the "best," digital adaptation engine or processor for particular records. As shown in FIG. 8, a digital adaptation for particular records is requested. A Digital Adaptation Framework includes a Framework Service Selector. The Preservation and Service Plan, the Data Type Descriptor, and the Digital Adaptation Descriptor are included in the Framework Service Selector. A plurality of Digital Adaptation Processors 1 . . . n are "scored" by the POM and compared against each other to determine which Digital Adaptation Processor is most appropriate for the Preservation and Service plan of the records.

As an example, the Preservation and Service Plan of the records may require that pagination of the records be preserved, but make preservation of color optional. In other words, pagination would be weighted more than color. Digital Adaptation Processor 1 may preserve pagination, but only support black and white transformation. Digital Adaptation Processor 2 may preserve color, but not preserve pagination. Digital Adaptation Processor n may preserve both pagination and color, but still be in development (e.g. may be limited to a specified facility and/or network and therefore not meet the service requirements).

FIG. 9 illustrates an example of preservation matching for two Digital Adaptation Processors. The Digital Adaptation Descriptor 1, i.e., the assessment of the processor's capability to meet the preservation objectives of the Preservation and Service Plan expressed in the form of the POM, for the first processor indicates an exact match for the perceptual characteristics. The Digital Adaptation Descriptor 2 for the second processor indicates an exact match for the logical characteristics. Taking into account the weight, or relative importance, of the characteristics, the Digital Adaptation Descriptor 1 is the most appropriate choice as it possesses an exact match for the characteristic having the higher relative importance. The design of the preservation architecture should, however, provide the ability to override the automatic selection of a Digital Adaptation Processor and allow the user to specify directly which Digital Adaptation Processor to use. This would allow the user to specify multiple processors so that their results may be compared manually.

An algorithm for calculating the score of each Digital Adaptation Processor 1 . . . n may be used. The algorithm may be constructed to allocate "points" for (a) meeting defined threshold values, (b) exceeding the threshold values, and (c) applying the weighting across different elements of POM. Each data type used within the records may be associated with one or more digital adaptation descriptors, each of which has its own POM. This results in multiple matches of Digital Adaptation Processors with the records. The closeness of each match can be scored, allowing multiple Digital Adaptation Processors to be compared against each other to determine which is most appropriate for a given Preservation and Service Plan. Each match is scored by first comparing each of the "Degree of Fidelity" values for each characteristic. Each comparison of the characteristics is then weighted by its "Relative Importance" as specified in the Preservation and Service Plan. In addition, the match must assure that the essential characteristics are preserved by the Digital Adaptation Processor, regardless of the score. Each Digital Adaptation Processor's score becomes part of its digital adaptation profile. The ability to create a score for each Digital Adaptation Processor provides useful information to the user. The score quantifies the quality of each Digital Adaptation Processor's ability to meet the preservation objectives.

Future digital adaptations of the records can be accomplished by chaining multiple digital adaptations, or reusing the original records, or other available preservation versions of the record as the base for the next digital adaptation.

The use of the POM allows constant updating of system management information. For example, if a previously scored Digital Adaptation Processor is modified and/or improved, the modified/improved Digital Adaptation Processor can be rescored using the POM. A Digital Adaptation Processor that was not previously judged the most appropriate for the preservation objectives of a particular group of records may be determined to be the most appropriate when rescored. Later developed Digital Adaptation Processors may also be scored using the POM to determine how well the newly developed Digital Adaptation Processor compares to existing Digital Adaptation Processors. A registry of digital adaptation descriptors is maintained to allow for the creation, modification and deletion of all of the Digital Adaptation Processors usable in the ERA.

The use of the POM also provides useful guidance for preservation management investment decisions. Records that do not have "high" scores with available Digital Adaptation Processors may be identified so that additional Digital Adaptation Processors may be developed, or existing Digital Adaptation Processors may be improved.

As discussed above, although the POM is described in the context of digital adaptation processes, it should be appreciated that emulation technologies may also be used for preservation instead of, or in combination with, digital object format transformations and the framework discussed above with respect to FIGS. 7 and 8 will support the scoring of emulation capabilities The digital adaptations, or versions, of the records created during preservation processing are not considered to be records in their own right. The versions do not have a record catalog number and are recorded within the asset catalog within the node of the record from which they are derived. See co-pending, commonly assigned U.S. application Ser. No. 11/785,814, filed Apr. 20, 2007, titled SYSTEM AND METHOD FOR IMMUTABLY CATALOGING AND STORING ELECTRONIC ASSETS IN A LARGE SCALE COMPUTER SYSTEM, for a description of an asset catalog usable with the present invention.

Preservation processing according to the present invention begins with the selection of records to be preserved by an archivist, or with the initiation of a scheduled processing. The disposition agreement for the records is then retrieved from the Asset Catalog. The preservation plan for the records is then identified from the disposition agreement.

Once the preservation plan is identified, the data type profile for each data file in the records is retrieved. The preservation plan is compared to available to available preservation processing for each data type. If the data type has preservation processing that meets the preservation plan requirements, then digital adaptation processing is executed and the metadata of the record is updated to identify the new data files available to present the record. If the data type does not have preservation processing that meets the preservation plan, a default preservation processing for that data type may be performed and the inability to meet the preservation plan objectives will be recorded.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention. Also, the various embodiments described above may be implemented in conjunction with other embodiments, e.g., aspects of one embodiment may be combined with aspects of another embodiment to realize yet other embodiments.

What is claimed is:

1. A method for digitally preserving an electronic record in an electronic record archive system including at least one microprocessor, comprising:
    defining a preservation and service plan for the electronic record in a model stored in the electronic record archive system by the at least one microprocessor, the preservation and service plan including access requirements and authenticity requirements for a digital adaptation of the electronic record, and characteristics of the electronic record to be preserved in the digital adaptation of the electronic record, the model assigning a numeric value to each requirement and characteristic and to the relative importance of each requirement and characteristic;
    for each data type included in the electronic record, assigning a capability score to each digital adaptation processor configured to digitally adapt a data type, the capability score being indicative of the ability of the digital adaptation processor to meet the access and authenticity requirements and preserve the characteristics as valued in the model; and
    comparing the capability scores to determine the digital adaptation processor that most closely matches the model, wherein the access requirements comprise a location dependency, a device dependency, and/or a software dependency, the characteristics include a perceptual characteristic, a logical characteristic, a functional characteristic, a temporal characteristic, and/or a spatial characteristic, the authenticity requirements comprise a requirement for a certified copy and/or a normative requirement.

2. A method according to claim 1, wherein the numeric value assigned to each service requirement is a scaled value.

3. A method according to claim 1, wherein the numeric value assigned to each characteristic is a scaled value.

4. A method according to claim 1, wherein the numeric value assigned to each authenticity requirement is a binary value.

5. A method according to claim 1, wherein each digital adaptation processor comprises a profile, and assigning a capability score to each digital adaptation processor comprises comparing each profile to the model.

6. A method according to claim 5, further comprising:
    registering each digital adaptation processor.

7. A method according to claim 1, further comprising:
    registering data type descriptors, wherein the data format descriptors comprise information that identifies data types, information regarding a provenance of each type, and a list of the digital adaptation processors that support each type.

8. A method according to claim 1, further comprising digitally adapting the electronic record using each digital adaptation processor that most closely matches the preservation and service plan requirements and characteristics.

9. A method according to claim 1, wherein if none of the digital adaptation processors meets the access and authenticity requirements and preserves the characteristics for a data type as valued in the model, the method further comprises:
    using a default digital adaptation processor for that data type; and
    recording the inability of the data type to meet the preservation and service plan requirements and characteristics.

10. An electronic record archive system, comprising
    a preservation and service plan management device configured to create, retrieve, modify and/or delete a preservation and service plan for an electronic record, the preservation and service plan including access requirements and authenticity requirements for a digital adaptation of the electronic record, and characteristics of the electronic record to be preserved in the digital adaptation of the electronic record;
    a digital adaptation device comprising a plurality of digital adaptation processors, each digital adaptation processor configured to digitally adapt a data type; and a preservation processing device comprising a model of the preservation and service plan stored in the electronic record archive system, the model assigning a numeric value to each requirement and characteristic and to the relative importance of each requirement and characteristic, the preservation processing package being configured to assign a capability score to each digital adaptation process that supports a data format, the capability score being indicative of the ability of the digital adaptation processor to meet the access and authenticity requirements and preserve the characteristics as valued in the model, and being further configured to compare the capability scores to determine the digital adaptation processor that most closely matches the model, wherein the access requirements comprise a location dependency, a device dependency, and/or a software dependency, the characteristics include a perceptual characteristic, a logical characteristic, a functional characteristic, a temporal characteristic, and/or a spatial characteristic, the authenticity requirements comprise a requirement for a certified copy and/or a normative requirement.

11. An electronic record archive system according to claim 10, wherein the numeric value assigned to each service requirement is a scaled value.

12. An electronic record archive system according to claim 10, wherein the numeric value assigned to each characteristic is a scaled value.

13. An electronic record archive system according to claim 10, wherein the numeric value assigned to each authenticity requirement is a binary value.

14. An electronic record archive system according to claim 10, further comprising:

a digital adaptation management device comprising a registry of profiles of each digital adaptation processor, and being configured to create, retrieve, modify and/or delete profiles of each digital adaptation process.

15. An electronic record archive system according to claim 14, wherein the digital adaptation processor management device is configured to add each capability score for each digital adaptation process to its profile.

16. An electronic record archive system according to claim 10, further comprising:

a data type management device comprising a registry of data type descriptors, wherein the data type descriptors comprise information that identifies data types, information regarding a provenance of each type, and a list of the digital adaptation processors that support each type, and being configured to create, retrieve, modify and/or delete data type descriptors.

17. An electronic record archive system according to claim 10, wherein the preservation processing device is further configure to digitally adapt the electronic record using each digital adaptation processor that most closely matches the preservation and service plan requirements and characteristics.

18. An electronic record archive system according to claim 10, wherein if none of the digital adaptation processors meets the access and authenticity requirements and preserves the characteristics for a data format as valued in the model, the preservation processing device is further configured to
- use a default digital adaptation processor for that data type; and
- record the inability of the data type to meet the preservation and service plan requirements and characteristics.

\* \* \* \* \*